US009230223B2

(12) United States Patent
Cohen et al.

(10) Patent No.: US 9,230,223 B2
(45) Date of Patent: Jan. 5, 2016

(54) CONSISTENT PRESENTATION OF CONTENT AND PASSIVE RELEVANCE DETERMINATION OF CONTENT RELATIONSHIP IN AN ON-LINE COMMERCE SYSTEM

(75) Inventors: Alon Cohen, Palo Alto, CA (US); Guy Shaviv, Zichron Yaakov (IL)

(73) Assignee: Houzz, Inc., Palo Alto, CA (US)

( * ) Notice: Subject to any disclaimer, the term of this patent is extended or adjusted under 35 U.S.C. 154(b) by 652 days.

(21) Appl. No.: 13/472,409

(22) Filed: May 15, 2012

(65) Prior Publication Data

US 2013/0145292 A1    Jun. 6, 2013

Related U.S. Application Data

(60) Provisional application No. 61/567,012, filed on Dec. 5, 2011.

(51) Int. Cl.
| | | |
|---|---|---|
| *G06Q 10/00* | (2012.01) | |
| *G06Q 30/02* | (2012.01) | |
| *G06Q 30/06* | (2012.01) | |
| *G06F 3/0485* | (2013.01) | |

(52) U.S. Cl.
CPC ............... *G06Q 10/00* (2013.01); *G06Q 30/02* (2013.01); *G06Q 30/06* (2013.01); *G06F 3/0485* (2013.01)

(58) Field of Classification Search
CPC ............ G06F 17/30905; G06F 3/0485; G06Q 30/0641; G06Q 30/0643
USPC .................................................. 715/784, 730
See application file for complete search history.

(56) References Cited

U.S. PATENT DOCUMENTS

| | | | | |
|---|---|---|---|---|
| 6,041,335 A | * | 3/2000 | Merritt et al. | 715/203 |
| 6,456,305 B1 | * | 9/2002 | Qureshi et al. | 715/800 |
| 7,028,258 B1 | * | 4/2006 | Thacker et al. | 715/209 |

(Continued)

FOREIGN PATENT DOCUMENTS

| | | |
|---|---|---|
| WO | WO2010062800 | 6/2010 |
| WO | WO-2010141637 | 12/2010 |

OTHER PUBLICATIONS

"The Pendulum, Part 1." Mar. 20, 1998. [Retrieved on Sep. 9, 2014]. Retrieved from the Internet <URL: https://www.math.duke.edu/education/ccp/materials/diffeq/pendulum/pend1.html>.*

(Continued)

*Primary Examiner* — Kieu Vu
*Assistant Examiner* — Blaine Basom
(74) *Attorney, Agent, or Firm* — Michael A. Glenn; Perkins Coie LLP

(57) ABSTRACT

A platform allows experts, for example home improvement professionals, to upload their portfolios, i.e. content such as photos, videos, text, and sound, to a publicly available resource, such as a Web browser accessible, network based commerce system. Users may then browse the content, for example by room, style, and metro area. The content is arranged in collections that are in part passively sorted, based upon user relevance. Tags are shown on objects, for example within photos, for which there is more information. In the case of a movable display device, the tags can simulate the physics of real tags, for example they can move back and forth when the device is shaken. In another embodiment, a snap point is set to impart either a scrolling transition or a step transition between display pages, based upon user scroll activity.

15 Claims, 22 Drawing Sheets

(56) References Cited

U.S. PATENT DOCUMENTS

| | | | |
|---|---|---|---|
| 8,300,068 B2* | 10/2012 | Yamada | 345/681 |
| 8,560,533 B1* | 10/2013 | He et al. | 707/727 |
| 8,738,630 B2* | 5/2014 | Lin | 707/741 |
| 2005/0062758 A1 | 3/2005 | Kaasila et al. | |
| 2006/0012616 A1 | 1/2006 | Paek | |
| 2006/0100482 A1 | 5/2006 | Hale et al. | |
| 2007/0083810 A1* | 4/2007 | Scott et al. | 715/525 |
| 2010/0049802 A1 | 2/2010 | Ramen | |
| 2010/0235259 A1* | 9/2010 | Farraro et al. | 705/27 |
| 2010/0313141 A1 | 12/2010 | Yu et al. | |
| 2011/0087955 A1* | 4/2011 | Ho et al. | 715/230 |
| 2011/0093361 A1* | 4/2011 | Morales | 705/26.62 |
| 2011/0099494 A1* | 4/2011 | Yan et al. | 715/765 |
| 2012/0110442 A1* | 5/2012 | Sharkey | 715/251 |
| 2012/0154305 A1* | 6/2012 | Nunomaki | 345/173 |
| 2012/0174005 A1* | 7/2012 | Deutsch et al. | 715/764 |

OTHER PUBLICATIONS

Gould et al. "Chapter 6. Oscillations and the Simulation Interface." Feb. 21, 2002. [Retrieved on Sep. 9, 2014]. Retrieved from the Internet <URL: http://physics.clarku.edu/courses/125/gtcdraft/chap6.pdf>.*

Henderson, E , "Houzz: The Ultimate Guide to Design", Retrieved online Jan. 18, 2013 at http://iphone.appstorm.net/reviews/lifestyle/houzz-the-ultimate-guide-to-design, Oct. 26, 2011, 8 Pages.

* cited by examiner

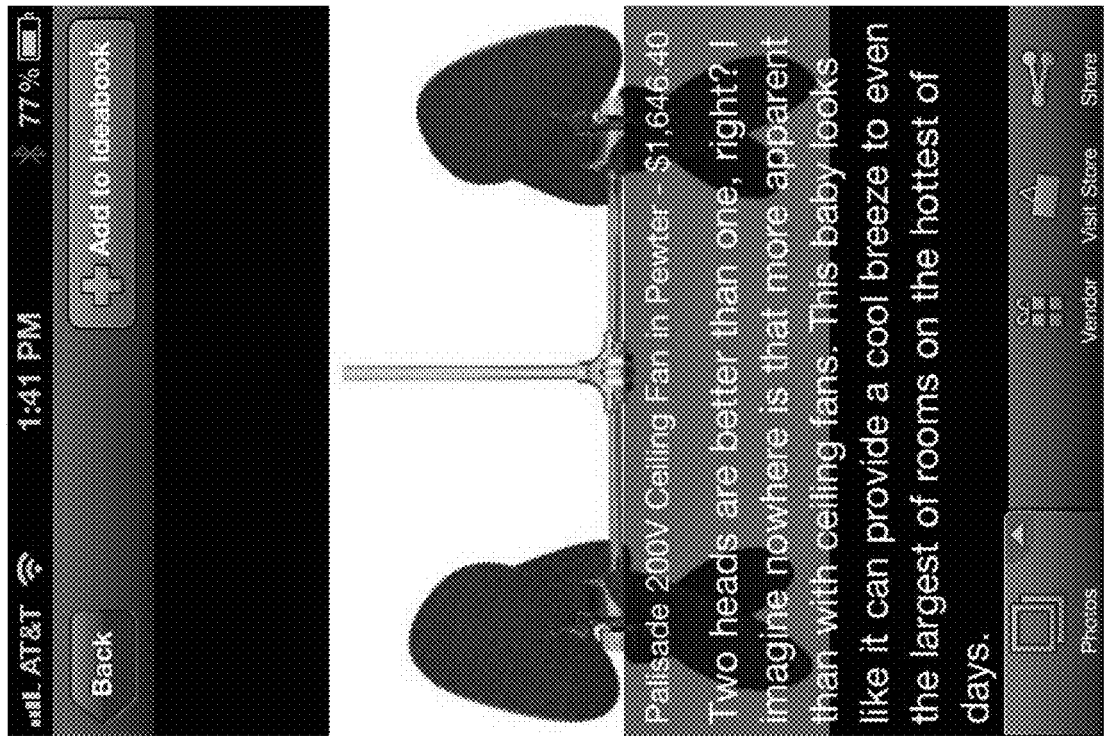

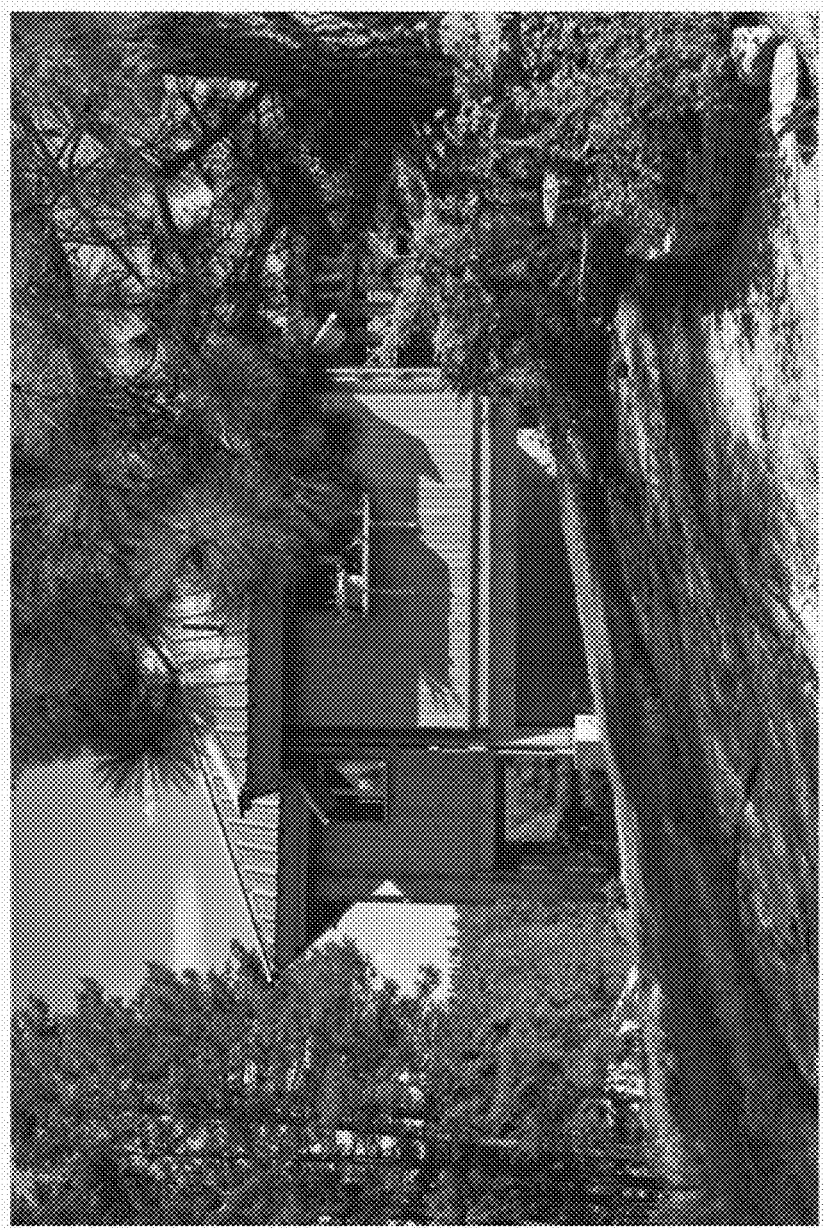

Mann looked closely at the bare minimum of what Franklin would need and what would meet local building code requirements. He chose a mandala shape a form commonly found in Buddhist and Hindu art. The house has an identical design on all four sides, which simplified construction.

A small basement under the central core stabilizes the structure, while the four peripheral building segments are supported on posts.

FIGURE 11C

CONSISTENT PRESENTATION OF CONTENT AND PASSIVE RELEVANCE DETERMINATION OF CONTENT RELATIONSHIP IN AN ON-LINE COMMERCE SYSTEM

CROSS REFERENCE TO RELATED APPLICATIONS

This application claims priority to U.S. provisional patent application Ser. No. 61/567,012, filed Dec. 5, 2011, which application is incorporated herein in its entirety by this reference thereto.

BACKGROUND OF THE INVENTION

1. Technical Field

The invention relates to the interactive organization and presentation of content within a semi-supervised expert domain. More particularly, the invention relates to the consistent presentation of content and passive relevance determination of content relationship in an on-line commerce system.

2. Description of the Background Art

Electronic commerce, commonly known as e-commerce, eCommerce, or e-comm, refers to the buying and selling of products or services over electronic systems such as the Internet and other computer networks. However, the term may refer to more than just buying and selling products online. It also includes the entire online process of developing, marketing, selling, delivering, servicing, and paying for products and services.

The amount of trade conducted electronically has grown extraordinarily with widespread Internet usage. The use of commerce is conducted in this way, spurring and drawing on innovations in electronic funds transfer, supply chain management, Internet marketing, online transaction processing, electronic data interchange (EDI), inventory management systems, and automated data collection systems. Modern electronic commerce typically uses the World Wide Web at least at one point in the transaction's life-cycle, although it may encompass a wider range of technologies such as e-mail, mobile devices, and telephones as well.

A large percentage of electronic commerce is conducted entirely in electronic form for virtual items, such as access to premium content on a website, but mostly electronic commerce involves the transportation of physical items in some way. Online retailers are sometimes known as e-tailers and online retail is sometimes known as e-tail. Almost all big retailers are now electronically present on the World Wide Web.

Electronic commerce that takes place between businesses is referred to as business-to-business or B2B. B2B can be open to all interested parties, e.g. commodity exchange, or limited to specific, pre-qualified participants (private electronic market). Electronic commerce that takes place between businesses and consumers, on the other hand, is referred to as business-to-consumer or B2C. This is the type of electronic commerce conducted by companies such as Amazon.com. Online shopping is a form of electronic commerce where the buyer is directly online to the seller's computer, usually via the Internet. There is no intermediary service involved. The sale or purchase transaction is completed electronically and interactively in real-time, such as in Amazon.com for new books. However, in some cases, an intermediary may be present in a sale or purchase transaction such as the transactions on eBay.com.

Online shopping has evolved to the point that a specific user experience is often provided for particular types of goods. Online shopping also includes recommendations, user reviews, and other social aspects of the goods listed on a particular site. Unfortunately, there is no way for a user to make much sense of the listed items because no thought goes into arranging and presenting the items in a meaningful way relative to each other across categories, nor is expert advice associated with the online sale of goods, nor is user interaction with the goods during their presentation considered in subsequent presentation of the goods. Further, most online commerce is presented in a format that belongs to an earlier era of the Internet, and that is not particularly well adapted for modern tablet and handheld devices.

SUMMARY OF THE INVENTION

The presently preferred embodiment of the invention comprises a platform that allows experts, in this embodiment home improvement professionals, to upload their portfolios, i.e. content such as photos, videos, text, and sound, to a publicly available resource, such as a Web browser accessible, network based commerce system. This content is uploaded by using self-service tools. Users may then browse the content, such as photos, by room, style, and metro area. Uniquely, the content, in this example the photos, is arranged in collections that are in part passively sorted, based upon user relevance.

Further, an embodiment of the invention presents tags on objects in photos for which there is, for example, more information, price information, and/or product information. In the case of a movable display device, the tags on the photo can simulate the physics of real tags, for example they can move back and forth when the device is shaken.

BRIEF DESCRIPTION OF THE DRAWINGS

FIG. 1b is a further screen shot showing products listed in the photo ad of FIG. 1a;

FIG. 5b is a screen shot showing a Web site linked to from the photo in the screen shot of FIG. 5a;

FIGS. 10c and 10d are screen shots of the photo ad page linked to the animated tags of FIGS. 10a and 10a, as shown on a handheld device, according to the invention;

FIGS. 11a-11f are screen shots that show pages as displayed with snapping (FIGS. 11a and 11b) and smart layout (FIG. 11c) according to the invention;

FIG. 11d is a screen shot that shows scrolling without snapping between the pages shown in FIGS. 11a and 11b;

FIG. 11e is a screen shot that shows scrolling without snapping between the page shown in FIGS. 11b and 11c;

FIG. 11f is a screen shot that shows display of the page of FIG. 11c without the use of the smart layout feature of the invention.

DETAILED DESCRIPTION OF THE INVENTION

Figure 1A:
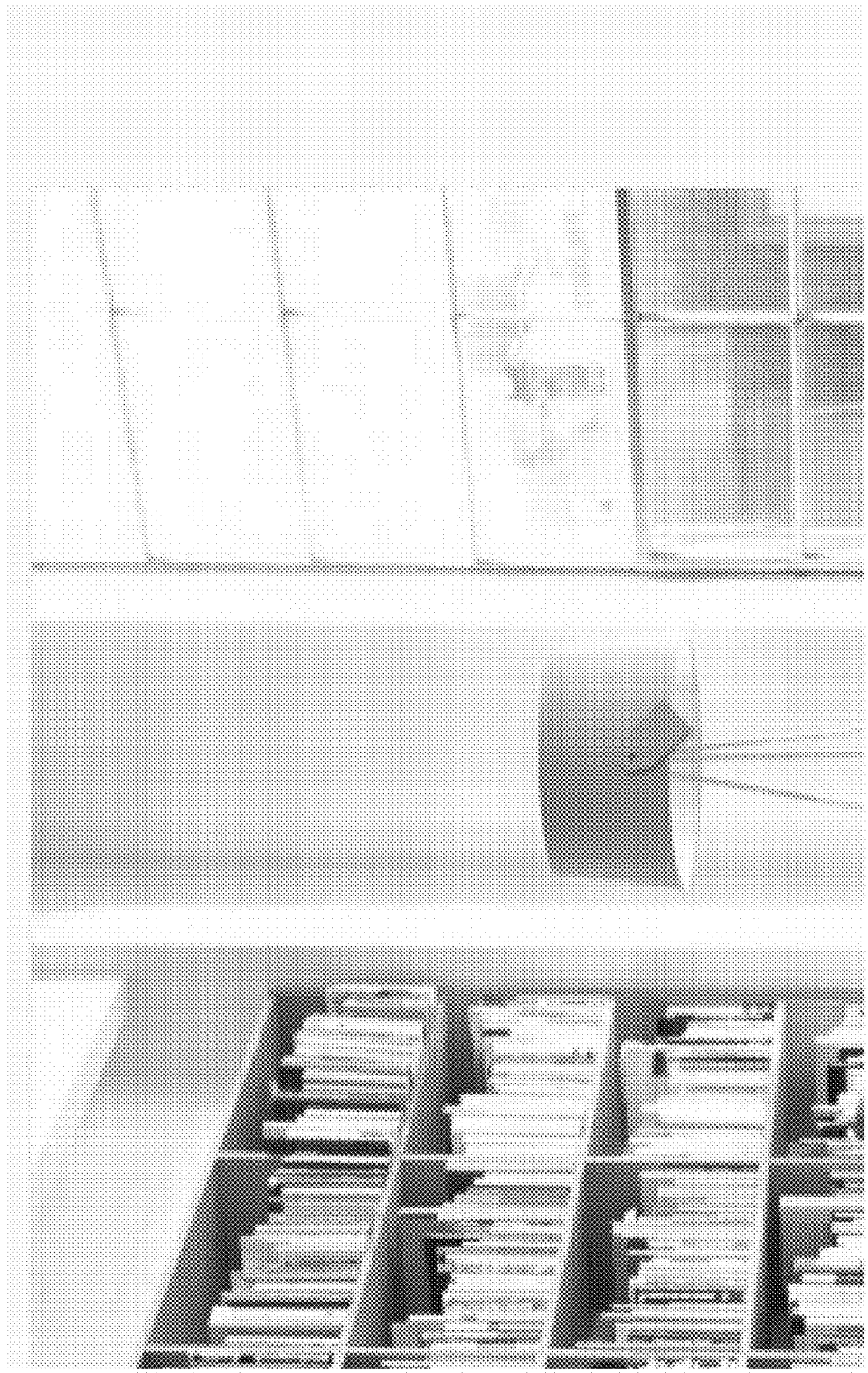
FIG. 1a is a screen shot showing a photo ad according to the invention.

The presently preferred embodiment of the invention comprises a platform that allows experts, in this embodiment home improvement professionals, to upload their portfolios, i.e. content such as photos, videos, text, and sound, to a publicly available resource, such as a Web browser accessible, network based commerce system. This content is uploaded by using self-service tools. Users may then browse the content, such as photos, by room, style, and metro area. Uniquely, the content, in this example the photos, is arranged in collections that are in part passively sorted, based upon user relevance. This is accomplished in an embodiment by providing users with tools for creating idea books. The idea books are produced when a user selects various photos in various categories for inclusion in their idea books.

The system monitors the user selection process to determine relationships between items within photos in selected categories. The system collates this information across the many users of the system and, thus, passively determines user relevance. For example, in the embodiment concerning residential interior design, photos may be organized in categories that correspond to the different rooms of a house, such as the bedroom, living room, etc. A user may proceed at the room level, adding design elements, furniture, and the like to an idea book for a particular room, for example the living room. Here, there are many styles available to the user, such as classic, modern, European, Asian, and the like. The user's idea book selections are that user's opinion as to design elements that may coordinate with each other, even if they are selected from a variety of styles. The system makes note of these connections for each user and, in the process, identifies user-based groupings that may then lead to new categories and/or suggestions to other users.

Further, this process may be applied across rooms, as well as styles. In this way, user idea book selections across a user population are used to identify trends and tastes. This information can be used to create recommendations, to reorganize content within categories, to create new categories, and to alert design experts and vendors with regard to user preferences.

In addition to passive determination of user relevance, an embodiment of the invention also allows user interaction with the content. For example, users may tag objects in photos and this information can be processed, as above for passive interactions, to organize and reorganize the presentation of content.

Photos may also be tagged editorially with links to information about the tagged objects. For example, a tag may provide a link to an expert discussion of the tagged object or to an expert in connection with the expert's design services, a link to other objects that are related aesthetically to the object or that are thematically consistent with the object, and/or a link to a distributor or manufacturer Website to facilitate commerce in connection with the tagged object and/or related objects. Further, the user may link to additional views of the tagged object, obtain options, select different coverings for the object, such as a different type of upholstery, which is then displayed in the photo, and save these objects in the user's idea book.

Thus, another unique aspect of the invention is the use of photo-based advertising. In contrast to banner ads, sidebars ads, pop-ads, and the other that populate the Web, the invention herein provides collections of photos that are related categorically and that are determined to be relevant by any or all of passive user interaction, user tagging, and expert supervised tagging. In this embodiment of the invention, all communication is image based. Rather than have ads that pop out and grab a user's attention, often annoyingly, an embodiment of the invention presents all photos, for example, in a collection in a consistent format.

Tags

The photos in a category or grouping are of the same size and shape or similar in size and shape, the objects in the photos are all thematically and/or aesthetically related to all other photos in the category or grouping, the use of icons or tags to indicate links to additional information is consistent. Thus, the user is presented with a 'walled garden' in which the substance of each photo is the focus of the presentation, and not the use of annoying or distracting attention getting devices. In this way, each ad itself looks like each other ad in a photo stream and the user may thus direct his attention to the perceived merits of the objects within the photos, and not the format of presentation of the photos.

Due to the relevance determination, filtering to a user query is precise. If a user wants to view photos related to, for example, dens, and the user is interested in French contemporary styling, then the photo stream presented to the user is constrained to relevant content, the content is consistently presented to allow the user to concentrate on the design elements within the photos and not on the presentation of the photos, and thus make a more natural and meaningful decision when selecting objects for inclusion in the user's idea book, and the user is afforded the opportunity to link to additional information upon selecting tags within a particular photo.

In an embodiment, users are able to ask professionals questions about the photos. Both users and an editorial team can tag the photos with products. Users can save photos to collections. Users can also browse a visual directory of professional service providers.

The tags presented to the user may be of various types. For example, the shape of the tag and/or color may be used to denote different classes of information. Thus, a dollar sign shaped tag may denote a link for purposes of commerce, a question mark may denote a link for expert advice, and the like. Further, it is clear that hand held devices, such as the iPad, are becoming increasingly popular and such devices are ideally suited for use in connection with the invention herein disclosed. For example, an embodiment of the invention provides motion sensitive tags that are activated when the display device, e.g. the iPad, is moved in a particular fashion, such as by shaking. Such action can make the tags appear, make the tags disappear, animate the tags, for example where the tags move back and forth to draw attention to them. In this and other embodiments, the user may set preferences with regard to the tags, for example, if animation is desired, if particular classes of tag are to be excluded or included, and if tag selection executes a particular action, such as adding a reference to the user's idea book, or generating a purchase inquiry, and/or if tags should not be displayed at all, i.e. they may be turned off.

Thus, an embodiment of the invention presents tags on objects in photos for which there is, for example, more information, price information, and/or product information. In the case of a movable display device, the tags on the photo can simulate the physics of real tags, for example they can move back and forth when the device is shaken (see FIGS. 11a and 11b, discussed below). In such case, the tags swing around a rotation point using pendulum equations of motion, or approximate pendulum equations of motions which are more computationally efficient on small devices, such as smartphones. In an embodiment, an approximate pendulum equation of motion is:

$$\theta'' = -k\theta - f\theta' \quad (1)$$

where:
- theta is the angle between the tag image orientation on the gravity vector, either the true gravity vector derived from the device sensors, or the apparent gravity direction derived from the image orientation;
- theta' is the angular velocity;
- theta'' is the angular acceleration;
- k represents a pendulum spring coefficient; and
- f represents a damping coefficient.

In an embodiment, the gravity direction in the image plane may be computed using the device's accelerometers. The gravity direction may be the gravity vector components in the image plane, or the down direction depicted in the image if the gravity has no component in the image plane, i.e. gravity is perpendicular to the image plane. The user interacts with the tags by swinging them or tapping them. By using the device's accelerometers and an appropriate band pass filter within the device's software, a user shaking the device introduces acceleration elements and motion to the tags as if the tags where a pendulum that is being pushed/swung. Thus, the tags appear to swing side to side and/or in and out of the plane of the display. This same effect may be achieved through any other user action, such as using a sliding gesture to flip from one page to another on the display. Other embodiments of the invention provide tags that mimic such real world phenomena, for example, such as springs, e.g. tags that bounce when the device is shaken, spinners, e.g. tags that spin when the device is rotated, and animation including starbursts, explosions, avatars, and the like.

Photo Ads

A common activity for those who use the invention is browsing photo streams. Users can filter photos by style (modern, traditional), space (kitchen, bedroom), and/or specify search terms (red sofa). In this case user is looking at modern family room photos. The photo ad unit is designed to be injected seamlessly into this stream. An example is shown in FIGS. 1a and 1b.

A photo ad has several components:
1. Promotional section contain information about the advertiser;
2. Photo; and
3. Products that are included in the photo.

Figure 1B:
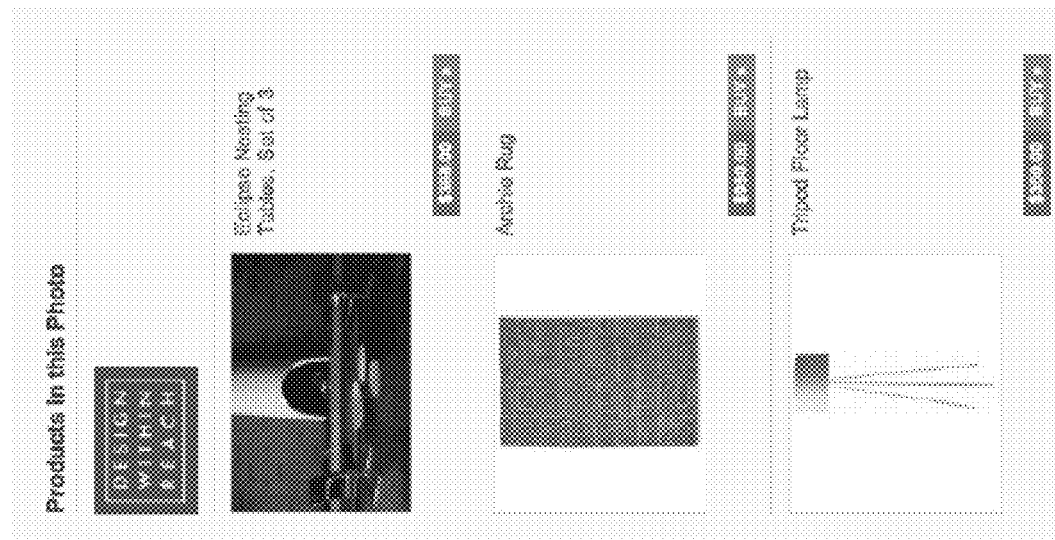

Clicking on the photo leads to a page hosted by, for example houzz.com that includes more information about the products on the photo (FIG. 1b). Users can click on "buy" button to purchase products on advertiser's Web site.

To make a photo ad appear seamless in the photo stream, it is important to select ads that are contextually relevant. This is achieved by the following:
1. Before a photo ad is run, the editorial team enter meta information about the photo, including:
   Style (modern, traditional)
   Space (kitchen, bedroom)
   Title
   Description
   Information about each product
2. The system ad server uses contextual information to match meta information in photo ad, including:
   Style (modern, traditional) of the current photo stream
   Space (kitchen, bedroom) of the current photo stream
   Search terms (red sofa)
   Meta information of the photos in stream, including style, space, title, description, image tags, and product tags. The meta information includes both editorial and community contributed content.
   User's past activities, e.g. on Houzz.com, including style, space, search terms used before, and photos viewed. In the example shown, a matching photo ad is selected because user is browsing modern family room photos.

Product Ads

Figure 2:
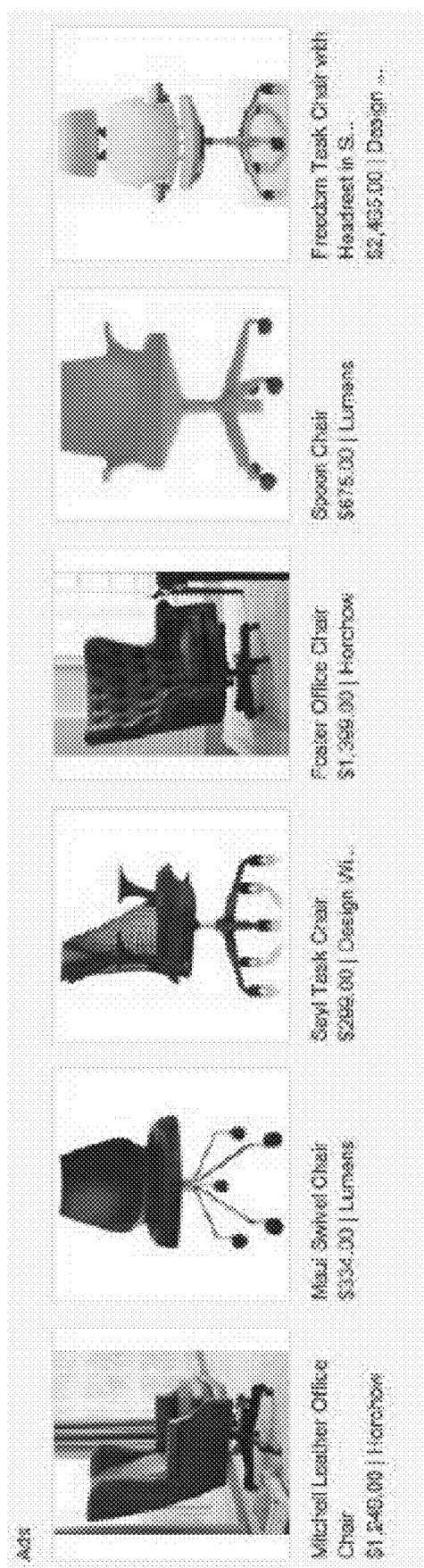
FIG. 2 is an example of product ads according to the invention.

In this ad unit, a Web site such as Houzz.com, for example, shows contextually relevant products associated with photos. An example is shown in FIG. 2. Similar to photo ads, the ad server uses meta information in photos (both editorial and community contributed content) to find appropriate Product Ads).

Recommendations

Figure 3:
FIG. 3 is a screen shot showing idea book recommendations according to the invention.

In an embodiment, users can add photos/products to their idea books. When they are doing this, they are making implicit associations between items (photos/products) in their collections (idea books) (see FIG. 3):
1. Items in same collection share some common attributes.
2. Items added by same user share some common attributes.

Figure 4:
FIG. 4 is a screen shot showing the recommending of new items that a user has not seen before according to the invention.
Figure 5A:
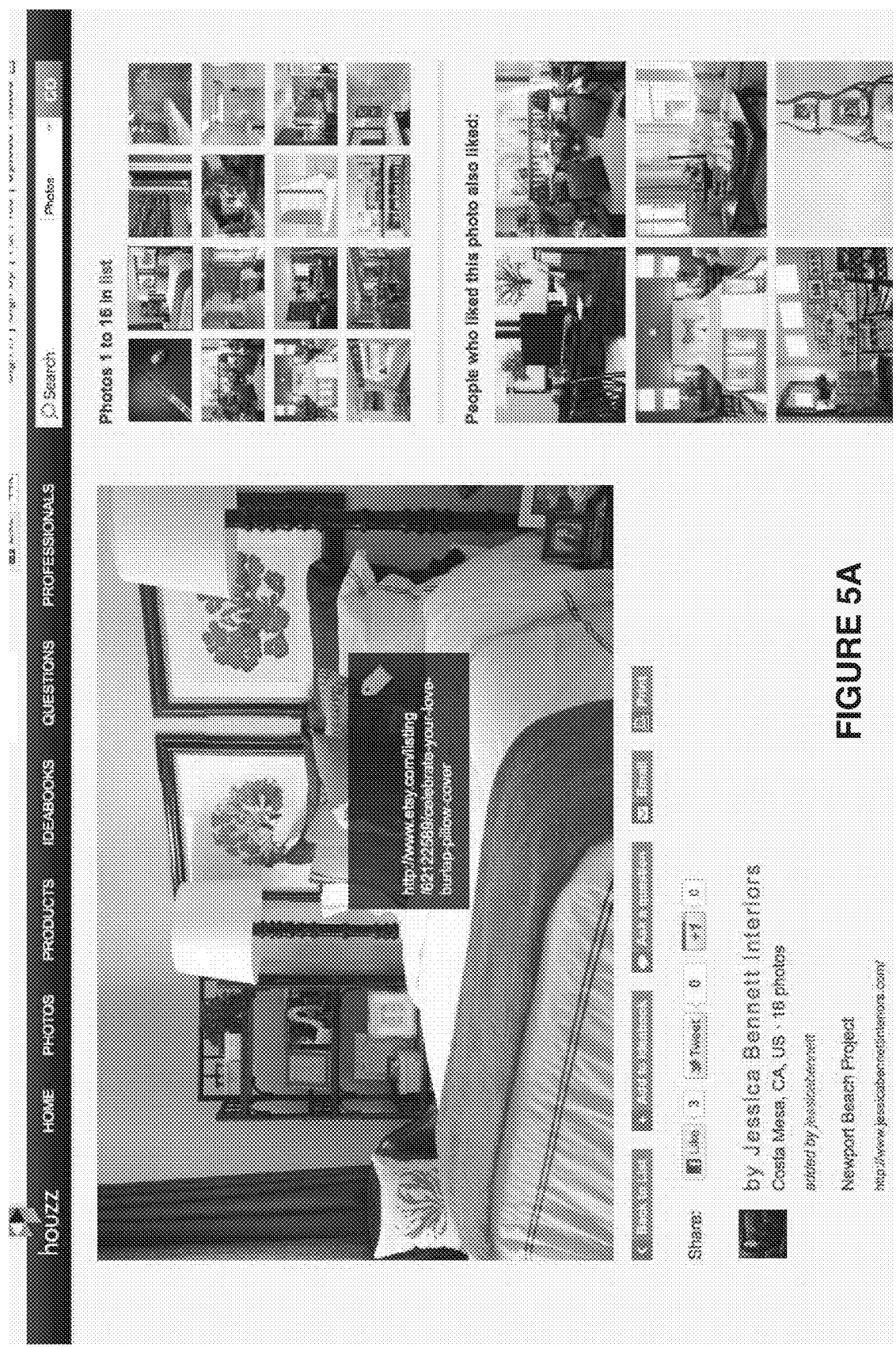
FIG. 5a is a screen shot showing the suggesting of items related to an item that is being shown according to the invention.
Figure 5B:
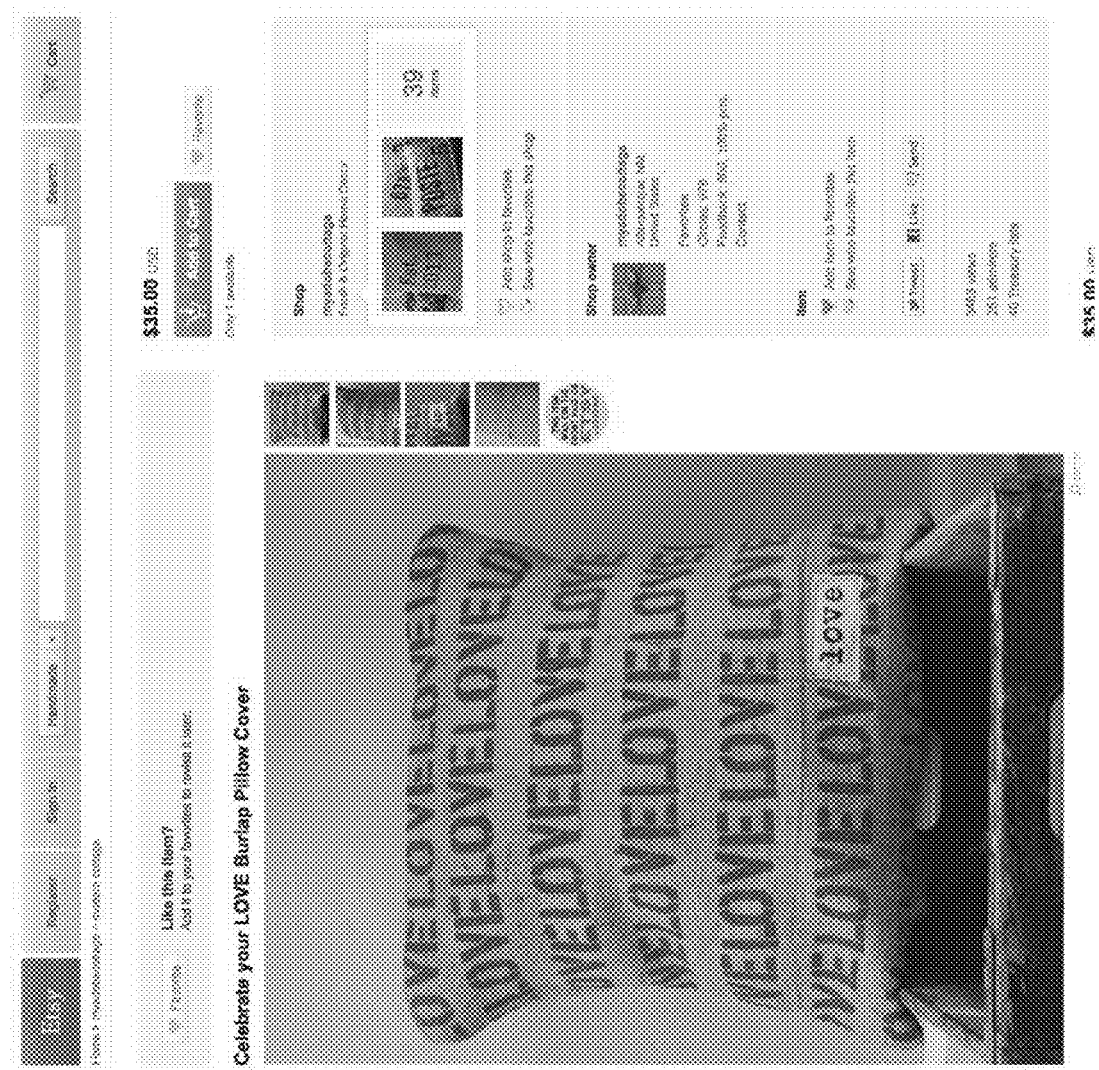

An embodiment applies collaborative filtering algorithms to find similar items. For each item, there is a set of users who have added it to one or more idea books. Given any two items, the system derives a similarity score based on the intersection of the two user sets. The system can enhance the score with a similar calculation on the collections that are associated with the items. Calculating similarity scores on every pair of items produces an item similarity matrix that can be used in different scenarios, e.g.:
1. Recommending new items that the user has not seen before (see FIG. 4);
2. Suggesting items related to the item that is being shown (see FIG. 5a, which shows a recommendation and FIG. 5b, which shows a product linked to a tag in the photo on the screen shot of FIG. 5a).

Because all of the implicit associations are analyzed, the system can produce interesting results, including:
1. Related items in different categories, for example, products related to photos;
2. Identify new groups of items that strongly related to each other.

Exemplary Embodiment in a Handheld Device

Figure 6:
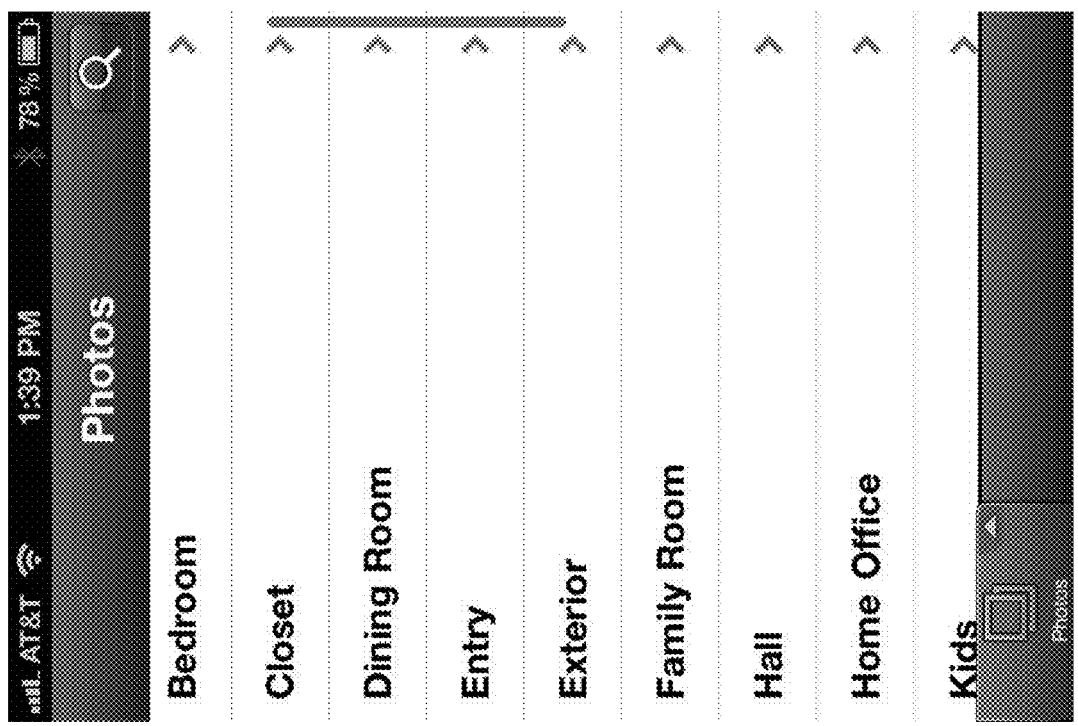
FIG. 6 is a screen shot of a photo category page, as shown on a handheld device, according to the invention.

FIG. 6 is a screen shot of a photo category page, as shown on a handheld device, according to the invention. In this embodiment, various home design related categories are shown. Other embodiments of the invention may provide appropriate categories for other domains, for example automotive, gardening, etc.

Figure 7:
FIG. 7 is a screen shot of a photo stream page, as shown on a handheld device, according to the invention.

FIG. 7 is a screen shot of a photo stream page, as shown on a handheld device, according to the invention. Once a category is elected, a photo stream is presented. Here the user is shown two streams, i.e. Metro Area and Style. Each of the streams may be further refined by user selection of appropriate pull down menus.

Figure 8:
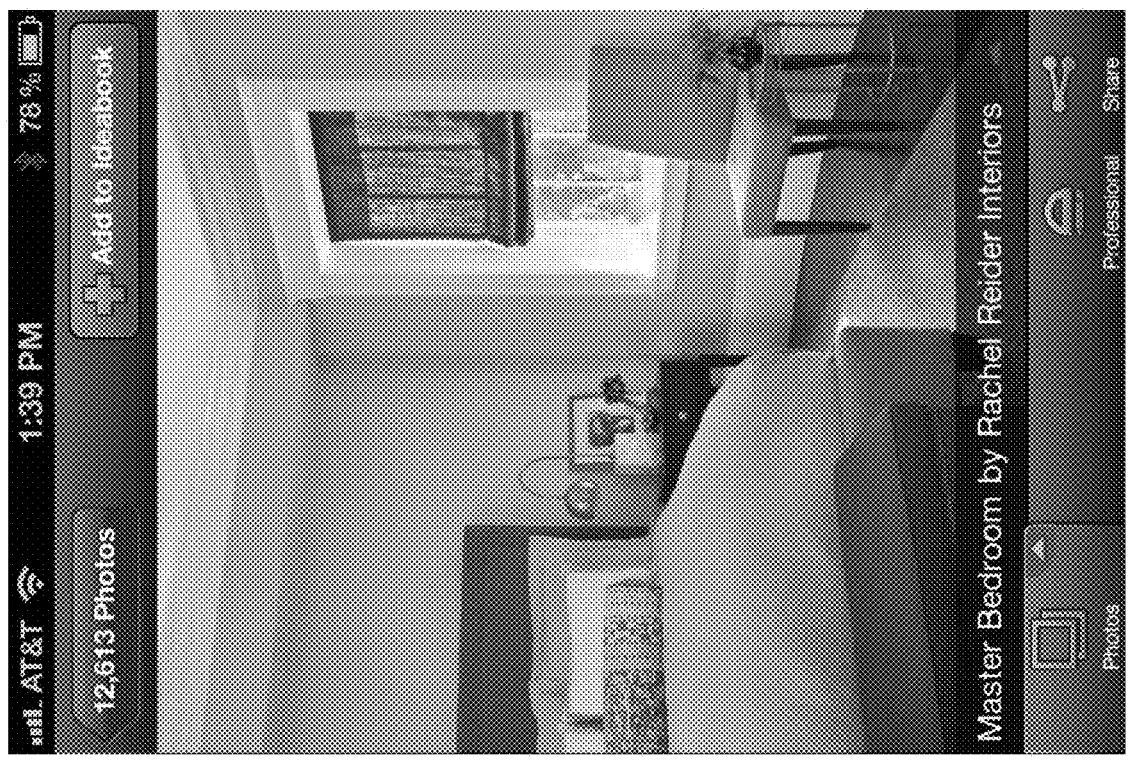
FIG. 8 is a screen shot of a photo stream page for an individual photo, as shown on a handheld device, according to the invention.

FIG. 8 is a screen shot of a photo stream page for an individual photo, as shown on a handheld device, according to the invention. This photo is selected from the photo stream of FIG. 7. Here, the user is given the option to add this photo to an idea book. The system monitors such selections, as discussed above, to refine system categorization and recommendations. The user is also provided with the option to seek information from a professional, such as the professional who prepared this photo in the photo stream as part of the professional's portfolio.

Figure 9:
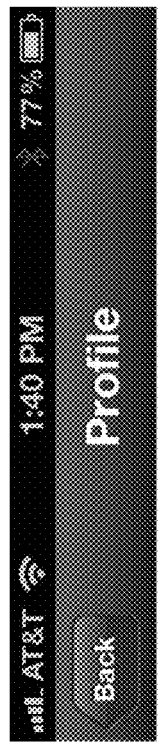
FIG. 9 is a screen shot of a profile page, as shown on a handheld device, according to the invention.
Figure 9:

FIG. 9 is a screen shot of a profile page, as shown on a handheld device, according to the invention. If the user selected information about the professional in FIG. 8, then this information is presented to the user. The user is then presented with links to the professional's photo stream, projects, and other information.

Figure 10A:
FIGS. 10a and 10b are screen shots of a photo stream page for an individual photo that has animated tags, as shown on a handheld device, according to the invention.
Figure 10B:

FIGS. 10a and 10b are screen shots of a photo stream page for an individual photo that has animated tags, as shown on a handheld device, according to the invention. Here, a photo of a bedroom is shown. the photo may be added to the user's idea book. The user may also turn on tags within the photo. In this example, a fan is tagged. The tag is animated to draw attention to the tagged object. In a photo having many objects, especially on a handheld device having a small display, the animated tag draws attention to objects for which additional information is available. As shown in FIG. 10a the tag has tilted to the left in response to user movement of the device. the tag swings back and forth and tilts to the right, as shown in FIG. 10b.

Figure 10C:
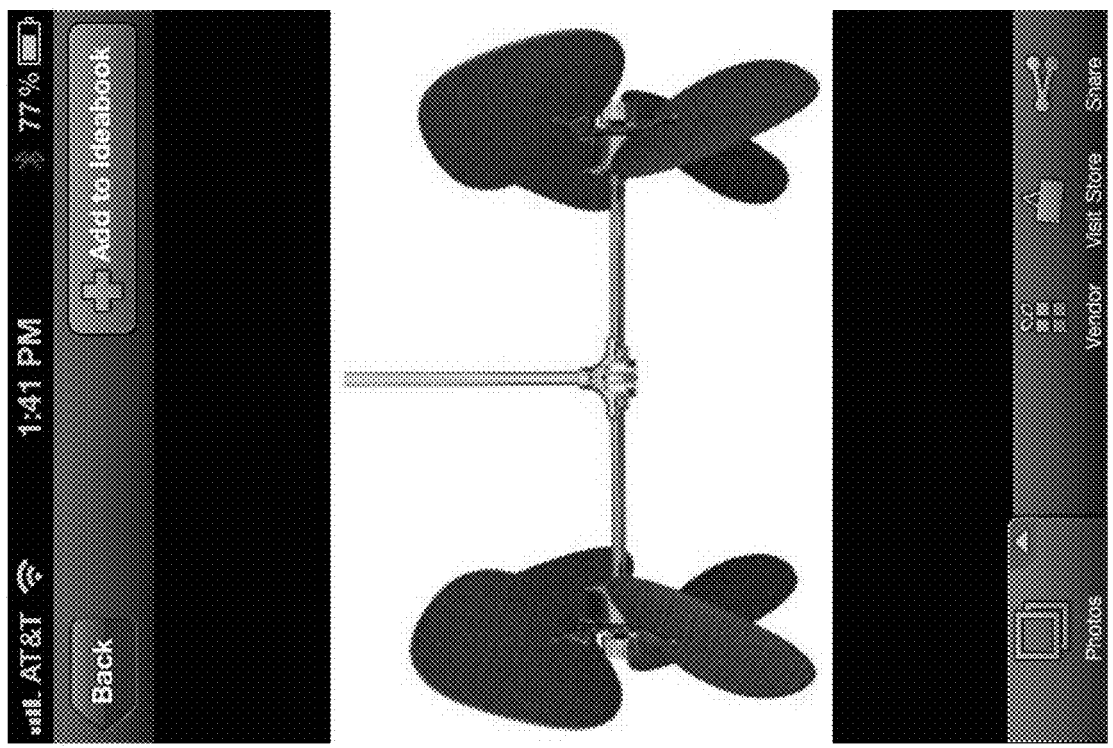

FIGS. 10c and 10d are screen shots of the photo ad page linked to the animated tags of FIGS. 10a and 10a, as shown on a handheld device, according to the invention. In FIG. 10c, the user has selected the tag for the fan of FIGS. 10a and 10b and a more detailed photo of the fan is presented. The user is also provided with links to the product vendor and an on line store if a purchase of the product is desired. In FIG. 10d, the user has selected the vendor option and more information is provided about the product.

Combined Presentation and Reading Mode Information Display

Presentation Mode vs. Reading Mode

When displaying information, such as articles, on an electronic device two distinct modes can be used.

A presentation mode typically consists of slides. Each slide contains some information and stands out on its own. One moves through the presentation by moving from slide to slide. The navigation is made simple by not needing to position each slide when reading; rather each slide occupies the entire display and is formatted to fit well in the display. A simple gesture, such as a button press or finger swipe, navigates the user to the next slide. In presentation mode there is no continuity, each slide is presented, typically occupying the entire display, and is whole in terms of content and self standing.

In a reading mode, that is typically employed by Web sites presented in a Web browser. Continuous information is displayed and the user can navigating by continuously scrolling down the display. Continuous scrolling provides continuity in the information presentation, the user never loses context of what was before what is on the screen and can see what is next. This display mode, however, lacks the visual impact of a slide mode. That is, the information can not be accurately positioned and laid out on the screen because it continuously scrolls. It also lacks the simplicity of a discrete event to move from slide to slide. Rather, the user is left with the burden of positioning the information on screen.

Accordingly, an embodiment of the invention provides a way to get the best of both worlds, a slide mode in a continuous scroll reading display. This is achieved in two steps:

1. A layout step identifies information units. These are groups of information items that relate to each other and which would be logical to display together. These information units are then laid out in such a way as to occupy screen full units as much as possible.
2. A presentation step which consists of a scrolling display and a smart snapping of the scroll position to logical location in the information unit display. In this way, the presentations appears as if the device is guessing what unit the user is looking at and positioning that information unit optimally on the screen.

Information Unit Identification

An information unit consists of items in the underlying text that can be grouped together, such as an image and its caption, paragraphs of text in the same text section or subsection, a title and its sub-title, author info, etc.

Information Unit Layout

When deciding on the layout of the unit, the screen size is brought into consideration. Some elements in the unit, such as photos, can typically be scaled and presented at several sizes. Other units, such as text, tend to have more of a fixed size, but their size can be controlled indirectly by setting the text column width, spacing between columns, spacing between paragraphs, etc.

When a unit has a photo and text, if the photo can be reduced in size such that the entire text that relates to it fits the screen, together with the image, the image is scaled down. The image is only scaled down up to a minimum presentation size. If the minimum size is not sufficient so that the text and image fit the screen together, the image is presented in the maximum scaling. This makes the unit fit an entire screen if possible, thus preserving an appealing visual impact by not down scaling images too much, and only scaling them down if by doing so the added benefit of having the text associated with it be visible in its entirety on-screen.

Presentation Snapping

When the user scrolls, a physics engine is used to move the screen and provide more realistic feedback. Using a physics engine in scrolling is common practice today and was pioneered by Apple in the iOS operating system on the iPhone. Usage of the physics system enables setting snap point, i.e. modifying the calculated target end points of the physics engine to more meaningful positions in the information flow, thus providing a natural snap feeling.

The target position of the scroll rest is set to the start of information unit, thus when the user flicks his finger on the screen, the scroll stops with an information unit at the top of the screen. Due to the layout the information unit fills the screen if possible. When the user continuously drags the scroll view, it is positioned where the user moved it to, providing a continuous scroll experience similar to regular scrolling presentations. No snapping is performed in this case.

Distinguishing between when to do snapping and when not to do snapping provides both the presentation feel, positioning the information feed at exact information units on the screen, and the continuous reading/scrolling feel enabling the user to position the information feed where he wants. When an information unit is too large to fit an entire screen, snapping positions inside the information unit are used, based on the structure of the information unit.

Examples are:
Top of a photo;
Top of a text description; and
Any break in a text description, such as sections, paragraphs, etc.

These in-information unit breaks are not used when the information unit fits inside the screen. This gives a slide feeling to the information presentation.

FIGS. 11a-11f are screen shots that show pages as displayed with snapping (FIGS. 11a and 11b) and smart layout (FIG. 11c) according to the invention. It can be seen that snapping provides a coherent and graceful transition between displays unit, i.e. pages, while smart layout provides a more proportional and balanced presentation of images and text relative to each other.

Figure 11A:
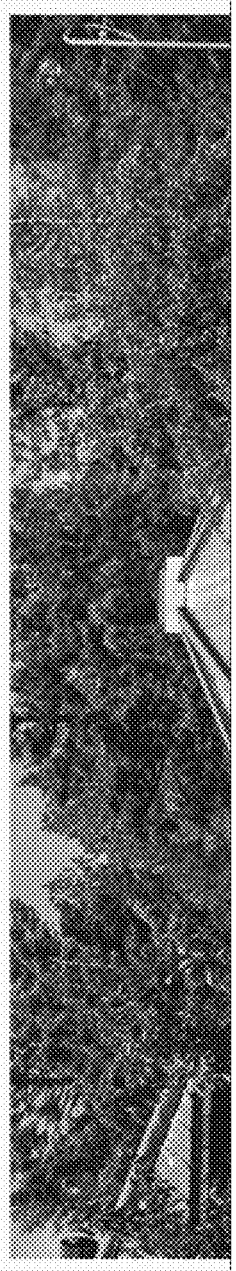
Figure 11B:
Figure 11D:
Figure 11E:
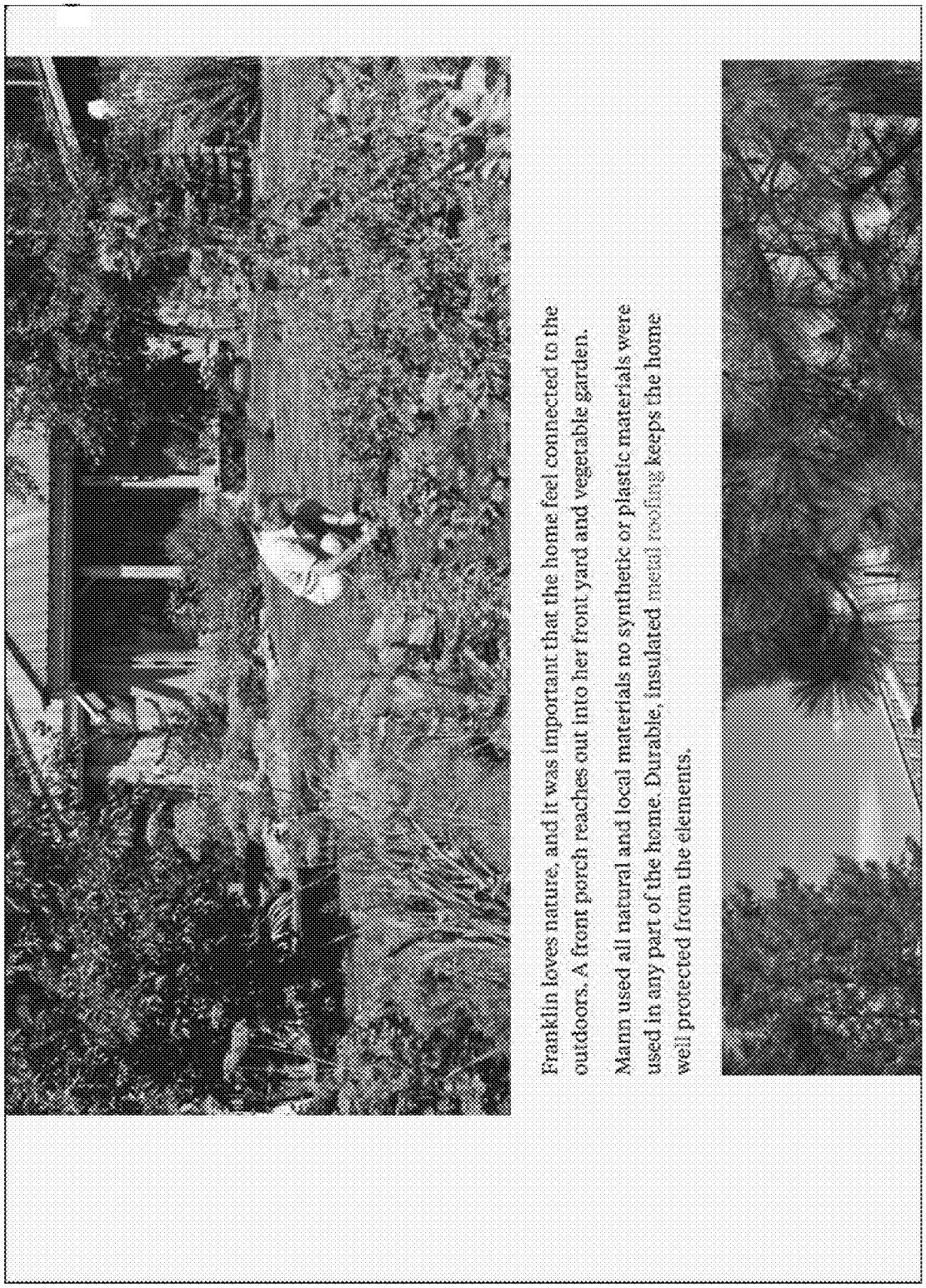
Figure 11F:
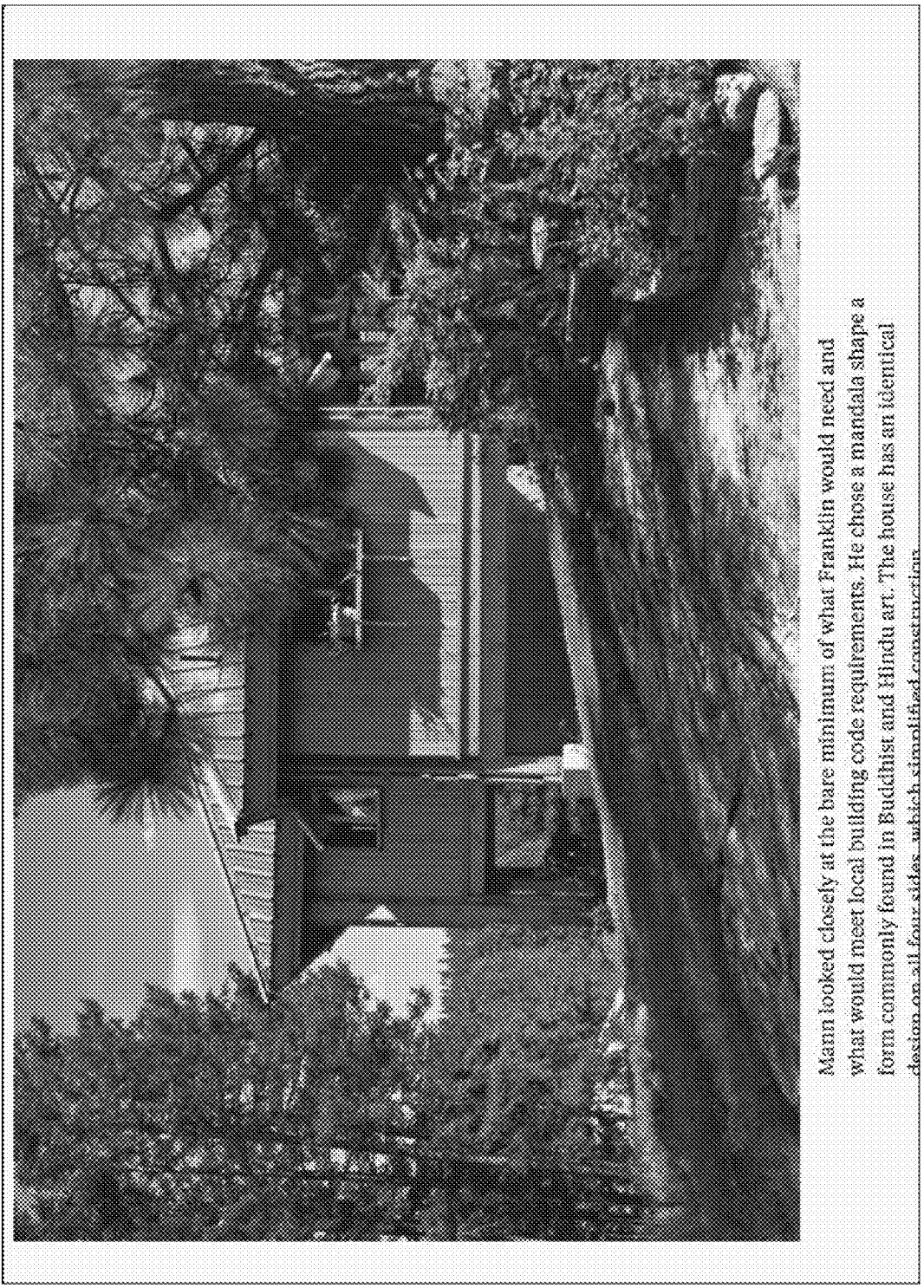

In contrast, FIG. 11d is a screen shot that shows scrolling without snapping between the pages shown in FIGS. 11a and 11b; FIG. 11e is a screen shot that shows scrolling without snapping between the page shown in FIGS. 11b and 11c; and FIG. 11f is a screen shot that shows display of the page of FIG. 11c without the smart layout. As can be seen, page transitions are awkward and nonsensical without the use of snapping, and here is no way to fit both the photo and its caption/referring text in the same screen without the use of smart layout.

Computer Implementation

Figure 12:
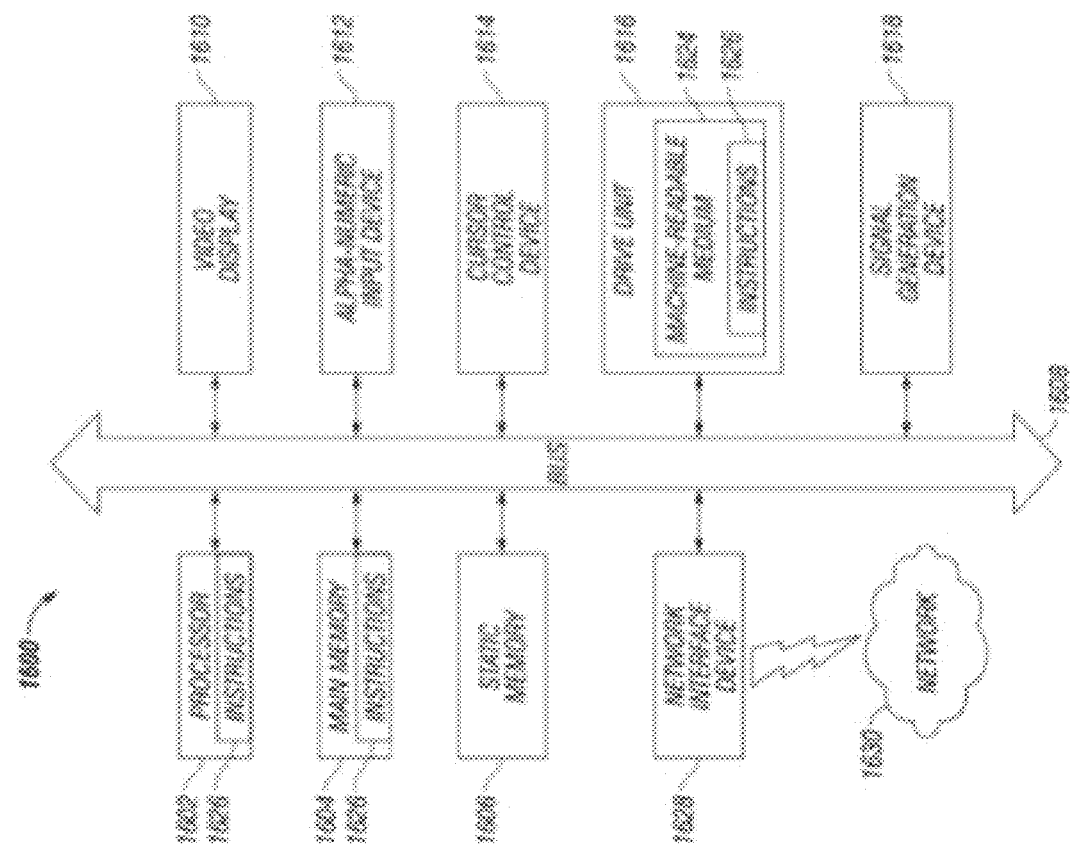
FIG. 12 is a block schematic diagram of a machine in the exemplary form of a computer system within which a set of instructions for causing the machine to perform any one of the foregoing methodologies may be executed.

FIG. 12 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
a processor providing browser accessible presentation of content, wherein said content comprises at least one photo stream comprising a plurality of formally consistent photos, each said photo comprising at least one object within a predetermined object category;
said processor arranging said content in categorical collections;
said processor observing user interaction with said content and, responsive thereto, sorting said content relative to said categorical collections based upon a passive determination by said processor of user relevance of said content and further based upon any of affirmative user interaction with said content and editorial interaction with said content;
said processor presenting a slide mode in a continuous scroll reading display, said facility identifying information units comprising groups of information items that relate to each other and which are logically displayed together, wherein said information units are laid out to occupy screen full units as much as possible;
said processor providing a scrolling display and a smart snapping of a scroll position to a logical location in an information unit display;
wherein when an information unit comprises both a photo and text, if the photo can be reduced in size such that the entire text that relates to it fits a display, together with the photo, then the photo is scaled down wherein, in such case, the photo is only scalable down up to a minimum presentation size, wherein if the minimum size is not sufficient so that the text and photo fit the display together, the photo is presented in a maximum scaling and the text is excluded from the display;
said processor overlaying interactive tags on objects shown in individual photos within said photo stream, wherein said tags provide links to information related to said tagged objects; and
said processor receiving user interaction relative to a tagged photo that is presented to a user comprising intentional user manipulation of a handheld display device on which said user views said tagged photo and to animate said tags responsively;

said processor processing information relating to user tagging of objects in photos to organize and reorganize presentation said of content;

the tags simulating the physics of real tags when the device is shaken by swinging around a rotation point using either a true gravity vector derived from device sensors or an apparent gravity direction derived from image orientation, said processor simulating the physics of real tags by approximate pendulum physics equations comprising:

$$\theta'' = -k\,\theta - f\,\theta'$$

where:
theta is the angle between the tag image orientation and a gravity vector or simulated gravity vector;
theta' is the angular velocity
theta" is the angular acceleration;
k represents a pendulum spring coefficient; and
f represents a damping coefficient.

2. The apparatus of claim 1, wherein said content is arranged in collections that are, in part, passively sorted based upon user relevance in response to information generated when said users create idea books, wherein said idea books are produced in response to user selection of one or more photos in one or more categories for inclusion in the user's idea book.

3. The apparatus of claim 2, wherein said user selection determines relationships between items within photos in selected categories.

4. The apparatus of claim 3, wherein said user selection information is collated across a plurality of users to passively determine user relevance.

5. The apparatus of claim 2, wherein said content concerns residential interior design; and
wherein said photos are organized in categories that correspond to different areas of a residence.

6. The apparatus of claim 5, wherein said user selection adds design elements to an idea book for a particular area of said residence.

7. The apparatus of claim 2, wherein said user's idea book selections comprise that user's opinion as to design elements that may coordinate with each other, even if they are selected from a variety of styles;
wherein said processor observing user interaction makes note of connections between styles established by selections of each user; and
wherein said processor observing user interaction identifies user-based groupings to provide new categories and/or suggestions to other users.

8. The apparatus of claim 2, wherein said user's idea book selections across a user population are used for any of identifying trends and tastes, creating recommendations, reorganizing content within categories, creating new categories, and alerting design experts and vendors with regard to user preferences.

9. The apparatus of claim 1, wherein photos in a same category or grouping are similar in size and shape; wherein objects in said photos are thematically and/or aesthetically related to all other photos in the same category or grouping, the use of icons or tags to indicate links to additional information is consistent.

10. The apparatus of claim 1, wherein a tag's shape and/or color denotes different classes of information.

11. The apparatus of claim 1, wherein said animation comprises any of making the tags appear, making the tags disappear, and moving the tabs back and forth, up and down, or in other motions to draw attention to them.

12. The apparatus of claim 11, further comprising:
a processor receiving and setting user preferences with regard to said tags comprising any of determining if animation is desired, if particular classes of tag are to be excluded or included, if tag selection executes a particular action, and if tags should not be displayed at all.

13. The apparatus of claim 1, further comprising:
a physics engine, wherein when the user scrolls, said physics engine moves a screen containing an information unit on the display in connection with a snap point, wherein a target position of a scroll rest is set to a start of an information unit, wherein a scroll stops with an information unit at the top of an information unit screen in response to a user flick motion to make the information unit fill the screen if possible, and wherein when the user continuously drags a scroll view, the information unit is positioned within the screen to where the user dragged it to provide a continuous scroll experience.

14. A method, comprising:
providing a processor for browser accessible presentation of content, wherein said content comprises at least one photo stream comprising a plurality of formally consistent photos, each said photo comprising at least one object within a predetermined object category;
arranging said content in categorical collections;
observing user interaction with said content and, responsive thereto, sort said content relative to said categorical collections based upon a passive determination of user relevance of said content and further based upon any of affirmative user interaction with said content and editorial interaction with said content;
overlaying interactive tags on objects shown in individual photos within said photo stream, wherein said tags provide links to information related to said tagged objects;
receiving user interaction relative to a tagged photo that is presented to a user comprising intentional user manipulation of a handheld display device on which said user views said tagged photo and to animate said tags responsively;
presenting a slide mode in a continuous scroll reading display, said presenting facility identifying information units comprising groups of information items that relate to each other and which are logically displayed together, wherein said information units are laid out to occupy screen full units as much as possible;
wherein when an information unit comprises both a photo and text, if the photo can be reduced in size such that the entire text that relates to it fits a display, together with the photo, then the photo is scaled down wherein, in such case, the photo is only scalable down up to a minimum presentation size, wherein if the minimum size is not sufficient so that the text and photo fit the display together, the photo is presented in a maximum scaling and the text is excluded from the display;
overlaying interactive tags on objects shown in individual photos within said photo stream, wherein said tags provide links to information related to said tagged objects; and
receiving user interaction relative to a tagged photo that is presented to a user comprising intentional user manipulation of a handheld display device on which said user views said tagged photo and to animate said tags responsively;
processing information relating to user tagginq of objects in photos to organize and reorganize presentation said of content;

the tags simulating the physics of real tags when the device is shaken by swinging around a rotation point using either a true gravity vector derived from device sensors or an apparent gravity direction derived from image orientation; and simulating the physics of real tags by approximate pendulum physics equations comprising:

$$\text{theta}'' = -k\,\text{theta} - f\,\text{theta}'$$

where:
- theta is the angle between the tag image orientation and a gravity vector or simulated gravity vector;
- theta' is the angular velocity
- theta" is the angular acceleration;
- k represents a pendulum spring coefficient; and
- f represents a damping coefficient.

15. The method of claim 14, wherein when the user scrolls, moving a screen containing an information unit on the display in connection with a snap point, wherein a target position of a scroll rest is set to a start of an information unit, wherein a scroll stops with an information unit at the top of an information unit screen in response to a user flick motion to make the information unit filling the screen if possible, and wherein when the user continuously drags a scroll view, the information unit is positioned within the screen to where the user dragged it to provide a continuous scroll experience.

* * * * *